No. 637,028. Patented Nov. 14, 1899.
C. V. PETRAEUS.
PROCESS OF MANUFACTURING LITHARGE.
(Application filed Mar. 22, 1897.)
(No Model.) 2 Sheets—Sheet 2.
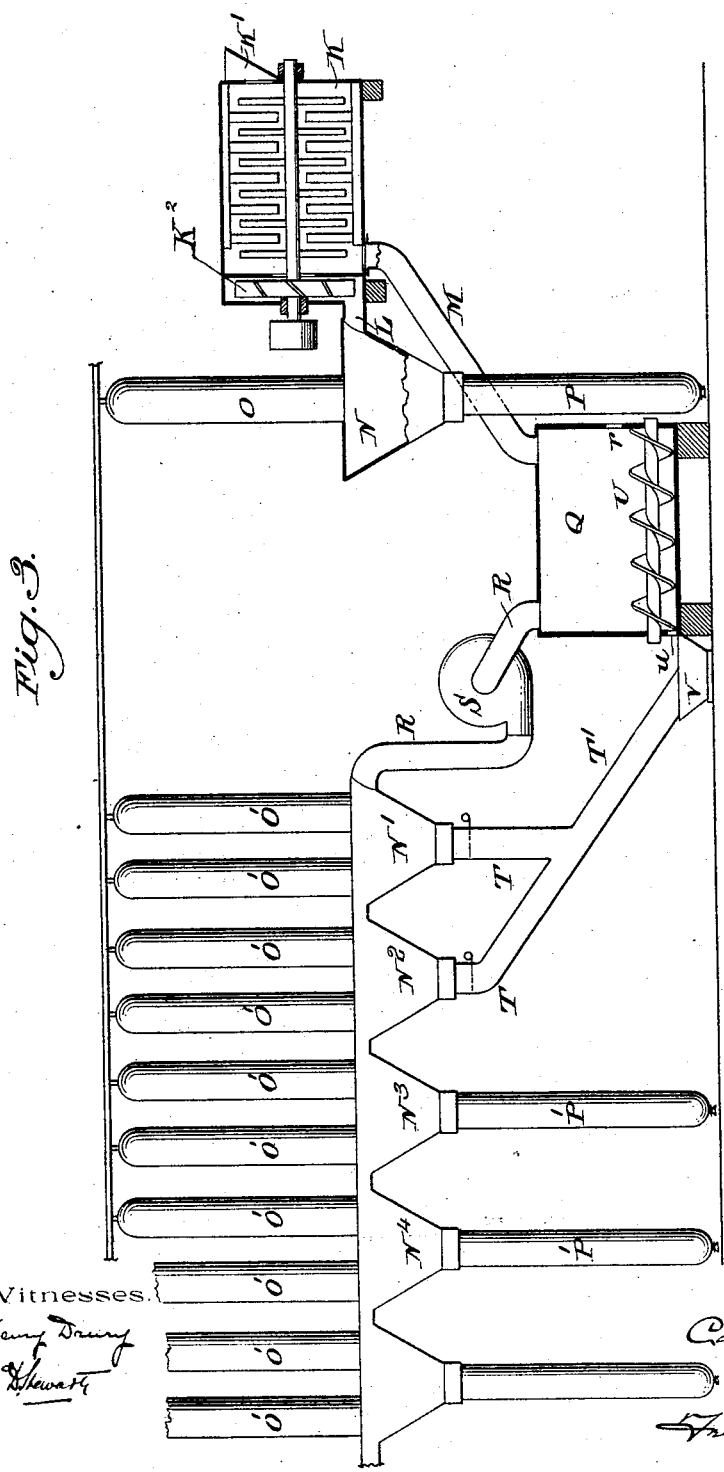
Witnesses.
Inventor.
Carl V Petraeus
by
Francis T Chambers
his Attorney.

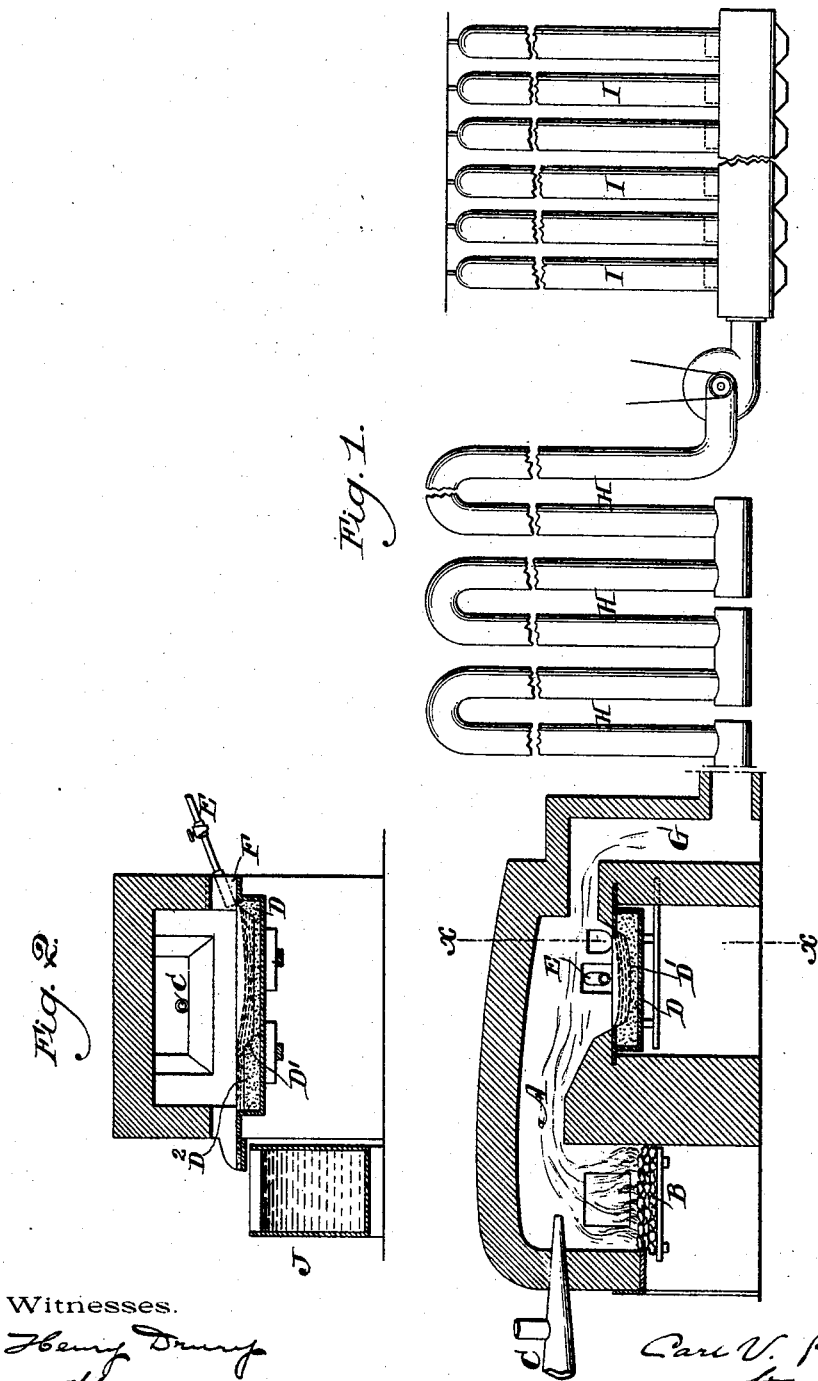

UNITED STATES PATENT OFFICE.

CARL V. PETRAEUS, OF JOPLIN, MISSOURI.

PROCESS OF MANUFACTURING LITHARGE.

SPECIFICATION forming part of Letters Patent No. 637,028, dated November 14, 1899.

Application filed March 22, 1897. Serial No. 628,629. (No specimens.)

*To all whom it may concern:*

Be it known that I, CARL V. PETRAEUS, a citizen of the United States of America, residing in Joplin, in the county of Jasper, in the State of Missouri, have invented a certain new and useful Improved Process of Manufacturing Litharge, of which the following is a true and exact description, reference being had to the accompanying drawings, which form a part thereof.

My invention relates to the manufacture of litharge, and has for its object to provide for a rapid and, as compared with former processes, a cheap production of litharge of a good marketable quality.

Heretofore commercial litharge has generally been made by subjecting melted lead to the action of blasts of air and collecting the the scum of lead oxid forming on the surface of the melted lead, which after grinding forms the commercial product known as "massicot" or "massicot-litharge." Where the lead scum is fused, its character is changed, the fused material on cooling disintegrating into a scaly-like substance, known as "flake-litharge," the flake-litharge differing widely from the commercial product known as "massicot" both in its color and in its adaptability for many uses to which the massicot is put.

The massicot-litharge is commercially made by heating lead to about a cherry-red heat—say 1,000° Fahrenheit—and constantly removing the scum of oxid which forms on the top of the lead-bath, so as to keep a metallic surface exposed to the air. Litharge has also been made as a by-product in the process of cupeling base bullion, and in the cupeling-furnace the lead is heated to a point slightly above the melting-point of litharge—say to about 1,260° Fahrenheit—and the molten litharge is run out of the cupeling-furnace through a gutter. It has been generally recognized that the production of litharge in the cupeling-furnace, while more rapid than in the ordinary treatments for the production of massicot-litharge, involves the loss of a considerable amount of lead, which passes off from the cupeling-furnace in the form of a fume and has been heretofore, so far as I am aware, lost. Another reason why the use of the cupeling-furnace and of a temperature above the melting-point of litharge has not been commercially used for the manufacture of litharge as distinguished from the refining of bullion is that the litharge being fused in the furnace the resulting product when it is cooled is the flake-litharge and not the more valuable product known as "massicot."

In my prior application for Letters Patent, filed February 11, 1896, Serial No. 578,835, I have described the combination of a screen system with a cupeling-furnace, said screen system being adapted to intercept and save such lead fume as is driven out of the cupeling-furnace, and the method of manufacturing litharge which consists in treating metallic lead in the said cupeling-furnace by blasts of air and at temperatures preferably considerably above the melting-point of litharge, the product of this treatment being partially-sublimed lead oxid caught in the screens and partially-fused litharge, which is run or tapped from the furnace in any convenient way.

My present invention is based upon two discoveries, one that the fused litharge drawn from the cupeling-furnace if suddenly cooled by running it into cool water will not form flake-litharge, but will be separated into a finely-divided granular mass of crystalline texture, which when ground has the color and properties generally recognized as peculiar to the massicot-litharge and which by reason of the granulation both of the oxid and of the metallic lead which may pass from the furnace with the lead can be more readily separated from the lead than is the case with the massicot made in the usual way. A further discovery, upon which the practical success of my process partially depends or which at least has a material influence on the commercial production of litharge by my process, is of the fact that as the temperature of the cupeling-furnace is increased above the melting-point of litharge the production of lead fume is not commensurate with the increase of temperature, as has been heretofore generally believed to be the case, but that at very high temperatures the lead fume driven from the furnace is not materially greater, if as great, as where the temperatures usual in the cupeling of bullion have been employed. The reason for this is, I believe, that at the high temperatures which I prefer to employ the particles of volatilized lead oxid produced in the furnace are fused and to a large extent are either intercepted by the fused litharge on the surface of the lead against which they are blown by the blast or fall back again into the furnace and are thus merged with the mass of fused oxid therein. I have also discovered that while the granulated product of my treatment may be advantageously treated by grinding, so as to bring the litharge into proper condition for commercial disposition and free it from lead particles, which by the grinding treatment are flattened out and readily separated in a bolt, better and more economical results can be obtained by subjecting the granulated litharge after drying it first to the action of a pulverizing apparatus other than a grinding-mill and then treating the product of such apparatus by blasts of air, which will separate the sufficiently-pulverized litharge from the coarser particles, including the particles of metallic lead with which it is apt to be admixed. Of course this air flotation or separation of the finely-pulverized lithage can be applied to the product produced by grinding the granular mass between rollers or stones, which flatten out the metallic particles; but the separation of the litharge from the metallic lead is more successfully accomplished by treating the granular mass in a pulverizing apparatus which does not flatten the metal. Irrespective, however, of the manner in which the granular litharge resulting from running the melted litharge into water is ground or pulverized I have found it to be decidedly advantageous to effect the separation of the commercial product from the metal and coarser particles by what may be called "air flotation" as distinguished from water flotation, which latter treatment is that in general commercial use with the ground massicot heretofore produced.

In the accompanying drawings, which form a part of this specification, I have illustrated the general outline of an apparatus suitable for use in connection with my improved method. It will be understood, however, that the said apparatus illustrated forms no part of my present invention and is here shown merely to assist in the explanation and understanding of my method.

In the said drawings, Figure 1 is a sectional elevation illustrating a cupeling-furnace adapted for use in my manufacture of litharge coupled with a system of cooling-flues and screens by which the volatilized lead oxid or fume carried out of the furnace can be caught and saved. Fig. 2 is a cross-sectional view taken on the line $xx$ of Fig. 1, showing also a water-tank into which the fused litharge produced in the furnace is run in order to effect its granulation; and Fig. 3 diagrammatically illustrates a pulverizing-machine and a system for effecting what by analogy to the usual methods may be called the "air flotation" of the pulverized litharge to effect the separation of the commercial article from the metallic and other coarser particles admixed with it.

A indicates the furnace; B, the grate, on which a fire of coal, coke, or charcoal can be made.

C is a nozzle for injecting hydrocarbon oil in admixture with air to heat the furnace.

D indicates the iron support for the crucible; D', the crucible-lining; $D^2$, the gutter into which the fused oxid runs or is forced by the air-blast and through which it is withdrawn from the furnace.

E indicates the air-blast pipe; F, an opening through which the crucible is charged with fresh lead.

G is the flue leading from the furnace.

H indicates a system of cooling-flues, and I a system of fabric screens in which the sublimed oxid is separated from the furnace-gases.

J indicates a tank or a trough adapted to contain water and into which the fused litharge is run from the gutter $D^2$.

K is the pulverizing-machine; K', the hopper, through which the granular litharge is charged to the pulverizer; $K^2$, a suction-fan at the rear end of the pulverizer; L, the passage through which the blast of air created by air forced through the pulverizer issues therefrom carrying with it finely-pulverized material.

M indicates the hopper or conduit, through which the coarser product of the pulverizer passes in admixture only with considerable fine material.

N indicates a receptacle into which the blast containing finely-pulverized material issues from the passage L, and O is a fabric screen connected with the receptacle N, through which the air can escape, but which intercepts the powdered litharge, P being a receptacle for the litharge, situated below the receptacle N and advantageously made of fabric in the form of a "sack," so to speak, so that air can escape through it, as well as through the screen proper O.

Q is a receptacle into which the conduit or passage M leads; R, is a conduit leading from the receptacle Q to a series of receptacles N' $N^2 N^3$, &c., and having in it a suction-fan S.

U is a conveyer situated in the bottom of the receptacle Q, adapted to force material settling to the bottom of the said receptacle out of an opening $u$ therein and into a receptacle V.

$r$ indicates an opening or series of openings, through which, as also through the opening $u$, air can enter the receptacle Q.

As shown, the receptacles or hoppers N' and $N^2$, into which the pipe R directly leads and which, as shown, are in communication with each other, open through conduits T T into a conduit T', which also leads to the receptacle V.

O' O', &c., indicate fabric screens situated above the hopper-receptacles.

N³ N⁴, &c., indicate further hopper-receptacles in communication with the receptacles N' N², as shown, having also fabric screens O' and receptacles for litharge, as indicated at P'.

In carrying my process into effect I charge the furnace A with lead of proper quality for the manufacture of litharge, and I heat the lead and furnace to a point considerably above the melting-point of litharge. In practice I have obtained excellent results by maintaining the furnace at or above a temperature of 1,750° Fahrenheit, maintaining, of course, an energetic blast of air, preferably preheated, upon the melted lead. The result of this treatment is the rapid production of litharge and the immediate fusion of the litharge as produced. Preferably I cool the furnace-gases issuing from the cupeling-furnace A in the cooler system H and screen it, as in the screening system I, so as to save such volatilized lead oxid as escapes; but at the high temperatures which I preferably employ the loss of lead through volatilization is not large, and the use of the screening system is not absolutely necessary to the mechanical practice of my method.

As my method is one essentially for the production of litharge, I preferably charge lead from time to time into the furnace A through the opening F, so as to maintain the charge in the crucible at approximately the same level, this precaution insuring a tolerably constant and even production of litharge. The melted litharge I draw off through the gutter D² or in any convenient way and cause it to fall into the cool water contained in the tank J, the action of the sudden chill being to granulate the litharge into a quite finely divided crystalline mass in which the lead particles, which to a greater or less extent pass from the furnace with the melted litharge, are also granulated in small masses and in convenient form for separation from the litharge.

I remove the granular mass from the tank from time to time and find it easy to dry it, as the greater part of the water readily drains from it and but little heating of the drained mass is necessary to make it entirely dry. Then I subject the granular dried mass to a grinding treatment, preferably in a pulverizer, which will not flatten out the metallic particles, and then separate the litharge which is sufficiently finely pulverized for commercial use from the lead particles and from the other coarser particles in admixture with it. Preferably I do this by a system of air flotation, and in the device shown the finer particles issuing from the pulverizer K pass with the air forced out of the pulverizer through the opening L, the air escaping through the screens O and the fine litharge being retained in the receptacle P. The rest of the product of the pulverizer passes through the conduit M into the receptacle Q, through which an energetic blast of air is drawn by the fan S. The air carrying the more or less finely-pulverized litharge with it passes then through the conduit R and through the receptacles N' N² N³, &c., the air being permitted to escape through screens, such as are indicated at O' O', &c., and the mass intercepted by the screens falling back into the hopper-like portions of the receptacles N' N² N³, &c. As shown, the receptacles N' and N², in which the coarser particles will be intercepted, discharge their contents through pipes T T and T' into the receptacle V. The more distant receptacles N³ N⁴, &c., receive only such finely-pulverized litharge as is fit for commercial use, and this material is caught in the bags P'. The conveyer U in the receptacle Q carries the heavier particles, which are not drawn with the blast into the conduit R, into the receptacle V, and the coarse particles accumulating in the receptacle V are from time to time charged back into the pulverizer K until the lead particles, which of course always reach the said receptacle V, become so considerable a portion of the mass as to make it desirable to remelt them.

Having now described my invention, what I claim as new, and desire to secure by Letters Patent, is—

1. The method of manufacturing lead oxid which consists in maintaining a litharge-furnace and the molten lead charged therein at a temperature considerably above that at which litharge melts, exposing said molten lead to the action of a blast of air to oxidize the lead, running the highly-heated and fused litharge out of the furnace and subjecting it while still fused to an energetic cooling to produce a fine crystalline granular litharge.

2. The method of manufacturing lead oxid which consists in maintaining a litharge-furnace and the molten lead charged therein at a temperature considerably above that at which litharge melts, exposing said molten lead to the action of a blast of air to oxidize the lead, and running the highly-heated and fused litharge out of the furnace, into cold water to effect the sudden cooling and the formation of a fine, granular litharge.

3. The method of manufacturing lead oxid which consists in maintaining a litharge-furnace and the molten lead charged therein at a temperature considerably above that at which litharge melts, exposing said molten lead to the action of a blast of air to oxidize the lead, running the highly-heated and fused litharge out of the furnace into cold water to effect its sudden cooling and the formation of a fine, granular crystalline litharge, then drying, and then reducing the granular mass to a generally pulverulent form and finally separating the pulverized litharge from the coarser particles of the mass by air-currents.

CARL V. PETRAEUS.

Witnesses:
J. H. DANGERFIELD,
A. E. SPENCER.